Aug. 18, 1970   J. E. RAWLINGS   3,524,672

AERODYNAMIC STABILIZER FOR VEHICLES

Filed March 7, 1968

United States Patent Office

3,524,672
Patented Aug. 18, 1970

---

3,524,672
AERODYNAMIC STABILIZER FOR VEHICLES
James Earl Rawlings, 18 Wood Lodge, Woodfield Lane, Ashstead, Surrey, England
Filed Mar. 7, 1968, Ser. No. 711,320
Int. Cl. B62d 37/02
U.S. Cl. 296—1                                              5 Claims

ABSTRACT OF THE DISCLOSURE

The present invention relates to an aerodynamic stabilizer for vehicles and is particularly applicable to rear-engined automobiles.

The stabilizer consists of an upper web which is to be secured to the underside of an automobile and an angled cross strut mounted beneath the web. As the car is driven forwards, air passes between the web and the strut and due to the tapered shape of the channel between the web and the strut, the speed of the air is increased thus causing a pressure drop in the area behind the strut which creates a downward pull on the stabilizer and hence on the automobile thus holding it more firmly on the road.

---

BACKGROUND OF THE INVENTION

The front end of rear-engined automobiles tends to lift at high speed with a consequent loss of steering control and susceptibility to side winds and it is an object of the present invention to provide a stabilizer which will increase the effective weight of the automobile and thus reduce the effect of side winds and give a more positive steering response at high speed.

SUMMARY OF THE INVENTION

According to the invention there is provided an aerodynamic stabilizer adapted to be mounted in the air flow beneath a vehicle, the stabilizer comprising a web having a planar undersurface, a cross strut mounted adjacent the undersurface of said web and spaced therefrom and having a planar surface inclined to the undersurface of said web in the normal direction of said airflow.

Preferably a plurality of planar supporting vanes are arranged substantially at right angles to the direction of said airflow and are secured between said web and said cross strut.

A preferred form of the invention will now be described with reference to the accompanying diagrammatic drawings in which.

Figure 1:
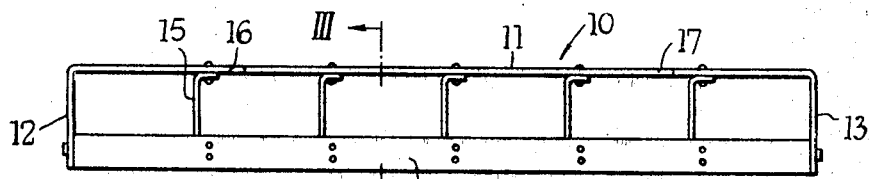
FIG. 1 is a front elevation of an aerodynamic stabilizer according to the invention.
Figure 2:
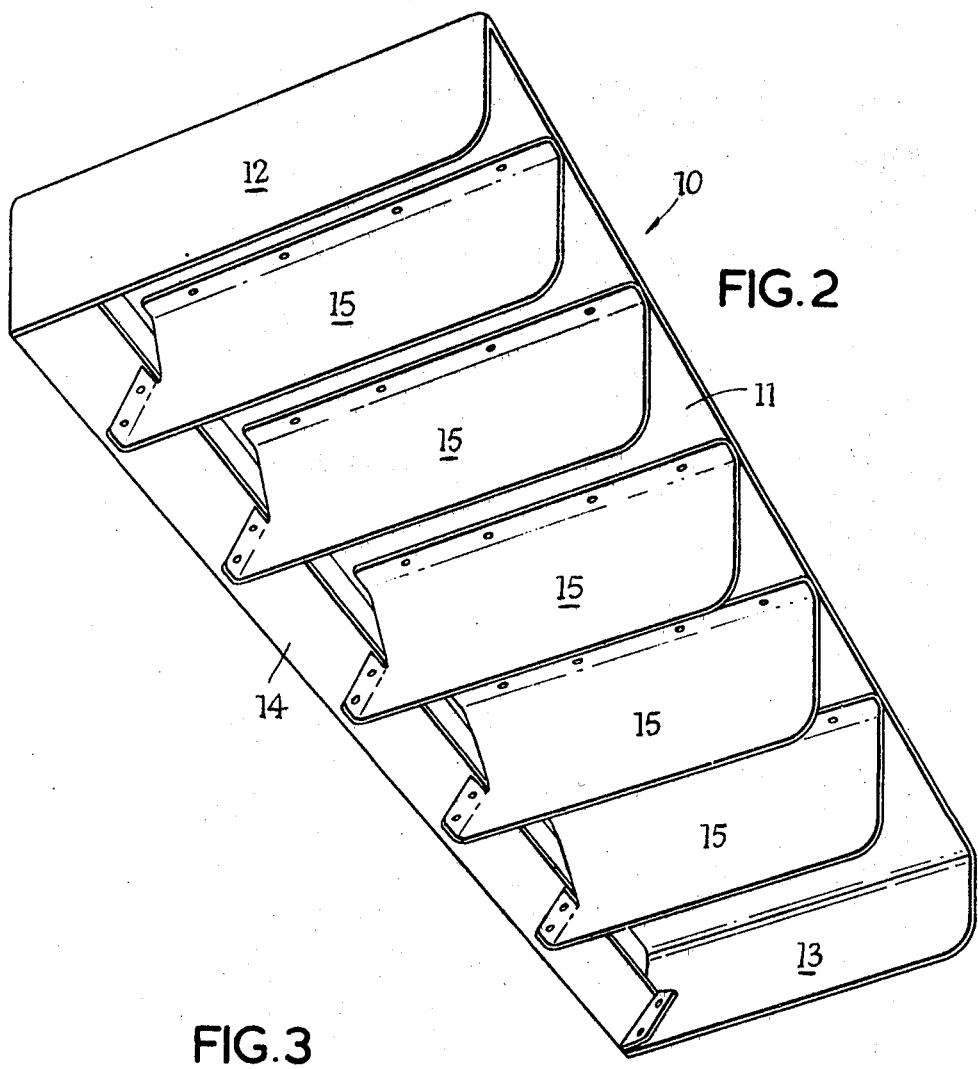
FIG. 2 is a perspective view from below of the stabilizer of FIG. 1.

In the drawings an aerodynamic stabilizer is indicated generally at 10.

The stabilizer 10 is preferably formed from sheet aluminium but may, if desired be made from any other suitable material such as a synthetic plastics or steel. In the event that it is manufactured from a material subject to corrosion it is preferably painted or coated with a similar protective material.

The stabilizer 10 comprises a flat rectangular sheet the ends of which are bent down at right angles so as to form a flat rectangular web 11 and two end flanges 12 and 13. A flat cross strut 14 is rivetted at each end to the end flanges 12 and 13 and is positioned at the front of the stabilizer 10 so that it is spaced from and inclined to the undersurface of the web 11. The angle of inclination of the cross strut 14 to the web 11 may be varied but is preferably within the range of 25°–35°. The cross strut 14 is supported by a series of spaced, flat vanes 15, which are arranged in parallel with the end flanges 12 and 13 and each of which is formed with a turned over flange at its front and upper edge which are rivetted to the cross strut 14 and to the web 11 respectively.

The web 11 is provided with two spaced apertures 16 and 17 and these are used to bolt the stabilizer to the underside of the front end of an automobile. In many rear-engined automobiles the spare wheel is carried beneath the front end of the automobile, approximately between the front wheels and in most cases the stabilizer 10 can be conveniently bolted to the spare wheel bracket.

Figure 3:
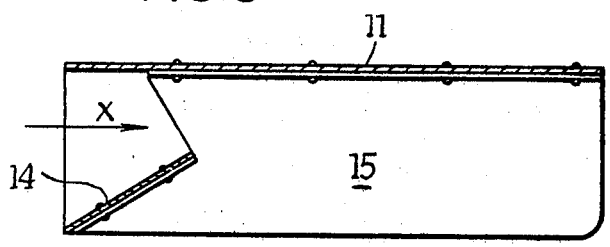
FIG. 3 is a section taken along the line III—III of FIG. 1.

When the stabilizer is in position beneath the automobile the web 11 lies uppermost and the cross strut 14 is inclined upwardly away from the front of the automobile. As the car is driven forward, air passes between the cross strut 14 and the web 11. Due to the inclination of the cross strut 14 and the formation of a tapered opening at the forward mouth of the stabilizer the speed of the air increases at it passes between the cross strut 14 and the web 11 as indicated by an arrow X in FIG. 3 and pressure in the area behind the stabilizer is reduced creating a downward pull on the car to hold it more firmly on the road.

It has been found that the effect of the stabilizer 10 on an automobile becomes noticeable, in a more positive steering response, at speeds from 40 m.p.h. upwards and at a speed of 200 m.p.h. it will increase the effective weight of the automobile by as much as 25%. As the speed of the automobile increases the effect of the stabilizer is also increased but it does not affect the top speed which can be achieved nor does it affect fuel economy.

The stabilizer 10 may be made any width or depth to suit a given car and it will be appreciated that the dimensions of the stabilizer will normally be determined and limited by the dimensions of the car on which it is to be used.

Other examples of this invention may be made by persons skilled in the art without departing from the scope and spirit of the attached claims.

I claim:

1. An aerodynamic stabilizer mounted in the airflow beneath a vehicle, the stabilizer comprising horizontal web having a planar undersurface and means for mounting the stabilizer beneath the said vehicle, a cross strut mounted adjacent the undersurface of said web so as to be spaced therefrom and having a planar surface inclined upwardly to the undersurface of said web in the normal direction of said airflow whereby the velocity of the airflow beneath the vehicle is increased as it flows over the web to reduce the normal differential in the velocities of the air flow above the vehicle and beneath the vehicle and thereby reduce the lift on the vehicle created by the said differential.

2. A stabilizer as claimed in claim 1 wherein the planar surface of said cross strut is inclined towards the undersurface of said web at an angle of between 25°–35°.

3. A stabilizer as claimed in claim 1 wherein a plurality of planar supporting vanes are arranged substantially at right angles to the direction of said airflow and are secured between said web and said cross strut.

4. A stabilizer as claimed in claim 3 wherein said vanes are arranged downstream of said cross strut in the normal direction of said airflow.

5. An automobile including an aerodynamic stabilizer mounted in the airflow beneath the vehicle stabilizer including a cross strut suspended from the undersurface of the vehicle and spaced therefrom, the cross strut having a planar upper surface which is inclined upwardly towards the undersurface of the vehicle in the normal direction of said air flow, whereby the velocity of the air flow beneath the automobile is increased as it flows over the web to reduce the normal differential in the velocities of the air flow above the automobile and the air flow beneath the automobile and thereby reduce the lift on the automobile created by the said differential.

References Cited
UNITED STATES PATENTS
2,297,979   10/1942   Peck ---------------- 138—39

BENJAMIN HERSH, Primary Examiner

L. J. PAPERNER, Assistant Examiner

U.S. Cl. X.R.
280—150